(12) United States Patent
Jang

(10) Patent No.: US 10,168,166 B2
(45) Date of Patent: Jan. 1, 2019

(54) METHOD AND SYSTEM FOR SEARCHING ROUTE

(71) Applicant: Thinkware Corporation, Seongnam-si, Gyeonggi-do (KR)

(72) Inventor: Won Dal Jang, Seongnam-si (KR)

(73) Assignee: THINKWARE CORPORATION, Seongnam-Si (KR)

(*) Notice: Subject to any disclaimer, the term of this patent is extended or adjusted under 35 U.S.C. 154(b) by 19 days.

(21) Appl. No.: 15/005,859

(22) Filed: Jan. 25, 2016

(65) Prior Publication Data

US 2016/0265934 A1  Sep. 15, 2016

(30) Foreign Application Priority Data

Mar. 13, 2015  (KR) .......................... 10-2015-0035302
Jun. 2, 2015   (KR) .......................... 10-2015-0078233

(51) Int. Cl.
    *G01C 21/00*   (2006.01)
    *G01C 21/34*   (2006.01)
    *G01C 21/36*   (2006.01)

(52) U.S. Cl.
    CPC ....... *G01C 21/343* (2013.01); *G01C 21/3614* (2013.01); *G01C 21/3664* (2013.01)

(58) Field of Classification Search
    None
    See application file for complete search history.

(56) References Cited

U.S. PATENT DOCUMENTS

| 8,028,225 | B2 * | 9/2011 | Zare ................. | G06F 17/30592 715/200 |
| 8,145,416 | B2 * | 3/2012 | Wailes ............... | G01C 21/343 340/995.1 |
| 8,275,352 | B2 * | 9/2012 | Forstall ............. | H04M 3/42365 455/404.2 |
| 8,656,314 | B2 * | 2/2014 | Locker .............. | G06F 3/04883 715/863 |
| 8,786,469 | B2 * | 7/2014 | Sheha ................ | G01C 21/36 340/539.13 |
| 2002/0107859 | A1 * | 8/2002 | Tsuyuki ........... | G06F 17/30067 |
| 2004/0054428 | A1 * | 3/2004 | Sheha .............. | G01C 21/3664 700/56 |
| 2009/0037101 | A1 * | 2/2009 | Koike .............. | G01C 21/3664 701/533 |
| 2009/0160732 | A1 * | 6/2009 | Kimura ............ | G01C 21/3664 345/1.1 |
| 2009/0271722 | A1 * | 10/2009 | Park .............. | G06F 3/0488 715/765 |

(Continued)

*Primary Examiner* — Truc M Do
(74) *Attorney, Agent, or Firm* — Fenwick & West LLP

(57) ABSTRACT

A method and system for a route search is provided. The route search method implemented with a computer includes displaying a map screen on a screen of an electronic device, verifying a position selected on the map screen according to a movement event of a user for an indicator indicating at least one of a departure point, a destination, or a stop or an indication line indicating a previously searched route, determining a road, corresponding to the verified position, as a new passing road, searching a route, between the departure point and the destination, including the new passing road, and displaying a map screen, associated with the searched route, again on the screen of the electronic device.

5 Claims, 21 Drawing Sheets

(56) References Cited

U.S. PATENT DOCUMENTS

| | | | |
|---|---|---|---|
| 2009/0282353 A1* | 11/2009 | Halbherr | G01C 21/3679 715/769 |
| 2009/0315867 A1* | 12/2009 | Sakamoto | G06F 3/03547 345/184 |
| 2010/0114471 A1* | 5/2010 | Sugiyama | G01C 21/3664 701/532 |
| 2010/0122195 A1* | 5/2010 | Hwang | G06F 3/0488 715/769 |
| 2012/0209506 A1* | 8/2012 | Tamayama | G01C 21/343 701/410 |
| 2013/0314357 A1* | 11/2013 | Sudou | G06F 3/0488 345/173 |
| 2013/0326380 A1* | 12/2013 | Lai | G06F 3/0481 715/765 |
| 2013/0326407 A1* | 12/2013 | van Os | G01C 21/00 715/810 |
| 2015/0276423 A1* | 10/2015 | McIlhany | G01C 21/367 701/426 |

* cited by examiner

1700

1800

1900

2000

2100

METHOD AND SYSTEM FOR SEARCHING ROUTE

CROSS-REFERENCE TO RELATED APPLICATIONS

A claim for priority under 35 U.S.C. § 119 is made to Korean Patent Application No. 10-2015-0035302 filed Mar. 13, 2015, and Korean Patent Application No. 10-2015-0078233 filed Jun. 2, 2015 in the Korean Intellectual Property Office, the entire contents of which are hereby incorporated by reference.

BACKGROUND

Embodiments of the inventive concepts described herein relate to technologies for searching routes, and more particularly, to systems and methods for searching routes including multiple passing roads.

There are technologies of searching and providing routes including multiple destinations such as destinations and stops. For example, Korean Patent Laid-open Publication No. 10-2009-0126144 discloses a route search method including a road section a user wants to pass and an apparatus therefor.

However, conventional technologies of providing multiple destination services request users to perform a plurality of operations to add, delete, or edit destinations (including stops). Also, when a new destination is added, since it is applied to set the destination to all roads, it is difficult to set roads that users want to avoid or pass.

Also, when users want to set a route to visit a plurality of destinations (e.g., a plurality of tourist destinations) once, since an order in which the users visit the plurality of destinations is determined according to an order in which they enter the destinations and the editing of them, it is difficult to perform an efficient route search. For example, there is a need for a plurality of complex operations in a process where users sequentially set a destination A, a destination B, and a destination C and add a destination D between the destination A and the destination B.

SUMMARY

Embodiments of the inventive concepts provide a system and method for providing a system and method for providing a route search service which may perform an editing function of easily and conveniently adding and/or deleting a destination and/or a road that users want to intentionally pass or avoid on a route and conveniently moving the added destination or road.

One aspect of embodiments of the inventive concept is directed to provide a route search method implemented using a computer. The route search method may include displaying a map screen on a screen of an electronic device, verifying a position selected on the map screen according to a movement event of a user for an indicator indicating at least one of a departure point, a destination, or a stop or an indication line indicating a previously searched route, determining a road, corresponding to the verified position, as a new passing road, searching a route, between the departure point and the destination, including the new passing road, and displaying a map screen, associated with the searched route, again on the screen of the electronic device.

The screen of the electronic device may include a touch screen. The movement event may include a drag and drop event on the touch screen for the indicator or the indication line. The position selected according to the movement event may include a drop position in the drag and drop event.

The route search method may further include determining roads to be displayed according to a map level of the map screen according to a hierarchical class which is preset to each of all roads. The determining of the road corresponding to the verified position as the new passing road may include calculating distances between the verified position and roads displayed in a current map level of the map screen and determining the closest road to the verified position as the new passing road among the displayed roads according to the calculated distances.

The route search method may further include displaying a deletion region on the screen of the electronic device and when an indicator on the indication line is moved to the deletion region displayed on the screen of the electronic device through a movement event for the indicator on the indication line, re-searching a route between the departure point and the destination except a passing road corresponding to the indicator on the indication line.

The route search method may further include displaying an indicator display region, where the indicator is selected, on the screen of the electronic device. The movement event for the indicator may include a movement event, for an indicator selected on the indicator display region, on the map screen or a movement event for an indicator on the indication line.

Another aspect of embodiments of the inventive concept is directed to provide a route search system. The route search system may include one or more processors. Each of the one or more processors may include a graphic processing unit configured to display a map screen on a screen, a position verifying unit configured to verify a position selected on the map screen according to a movement event of a user for an indicator indicating at least one of a departure point, a destination, or a stop or an indication line indicating a previously searched route, a new passing road determining unit configured to determine a road, corresponding to the verified position, as a new passing road, and a route search unit configured to search a route, between the departure point and the destination, including the new passing road. The graphic processing unit may display a map screen, associated with the searched route, again on the screen.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
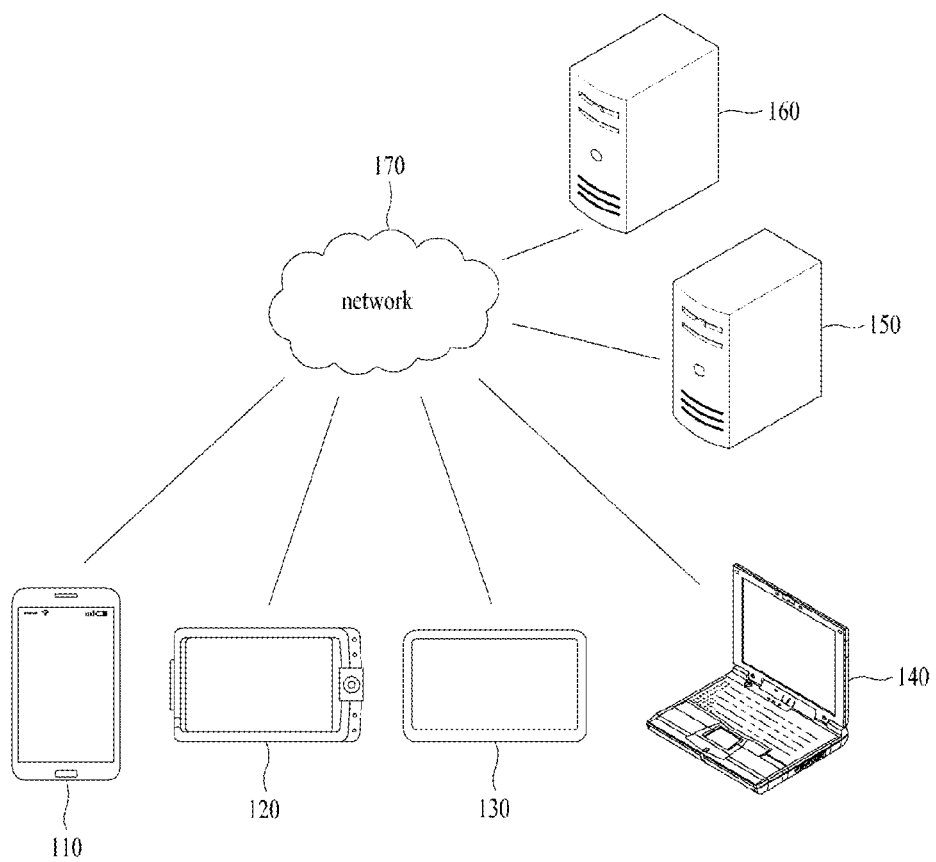
FIG. 1 is a drawing illustrating an operation environment of a route search system according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for exemplary embodiments of the inventive concept with reference to the accompanying drawings. However, the inventive concept is not limited by exemplary embodiments. Also, with respect to the descriptions of the drawings, like reference numerals refer to like elements.

FIG. 1 is a drawing illustrating an operation environment of a route search system according to an exemplary embodiment of the inventive concept. The operation environment of the route search system according to an exemplary embodiment of the inventive concept may include electronic devices 110, 120, 130, and 140, servers 150 and 160, and a network 170. The route search system according to another exemplary embodiment of the inventive concept may correspond to one (e.g., the electronic device 110) of the electronic devices 110 to 140. For one example, each of the electronic devices 110 to 140 may receive information for a route search service in real time from the servers 150 and 160 through the network 170 and may provide the route search service to a user. For another example, each of the electronic devices 110 to 140 may download information (e.g., map data, point of interest (POI) data, and the like) for a route search service in advance from the server 150 and 160 through the network 170, may generate information for the route search service for itself, and may provide the generated information to the user.

Each of these electronic devices 110 to 140 may be a fixed terminal or a mobile terminal. For example, the electronic devices 110 to 140 may be a smart phone, a mobile phone, a navigation device, a computer, a notebook, a digital broadcasting terminal, a personal digital assistant (PDA), a portable multimedia player (PMP), a tablet personal computer (PC), and the like. Each of these electronic devices 110 to 140 may communicate with other electronic devices and/or the servers 150 and 160 through the network 170 using a wired or wireless communication scheme.

The scope and sprit of the inventive concept may not be limited to the communication scheme. For example, the communication scheme may include a communication scheme using a local area wireless communication network between devices as well as a communication scheme using a communication network (e.g., a mobile communication network, a wired internet, a wireless internet, and a broadcasting network) which may be included in the network 170.

The network 170 may include one or more of networks, such as a personal area network (PAN), a local area network (LAN), a campus area network (CAN), a metropolitan area network (MAN), a wide area network (WAN), a broadband network (BBN), and the Internet. Also, the network 170 may include, but is limited to, one or more of network topologies which include a bus network, a star network, a ring network, a mesh network, a star-bus network, a tree or hierarchical network, and the like.

Each of the servers 150 and 160 may be implemented with a device or a plurality of devices which may communicate with the electronic devices 110 to 140 through the network 170 and may provide contents for a route search service to the electronic devices 110 to 140. For example, each of the servers 150 and 160 may provide codes, which may configure a screen of each of the electronic devices 110 to 140, according to a request of the user through each of the electronic devices 110 to 140. In an exemplary embodiment of the inventive concept, each of the electronic devices 110 to 140 may provide contents to the user by configuring and displaying its screen according to codes provided using a program included in each of the electronic devices 110 to 140.

In another exemplary embodiment of the inventive concept, as described above, each of the electronic devices 110 to 140 may download and store data, necessary for providing a route search service, in advance through the servers 150 and 160. Each of the electronic devices 110 to 140 may generate content for the route search service for itself using the stored data and data of each of the electronic devices 110 to 140 and may provide the generated contents to the user.

Hereinafter, a description will be given of the one electronic device 110 according to various exemplary embodiments of the inventive concept.

Figure 2:
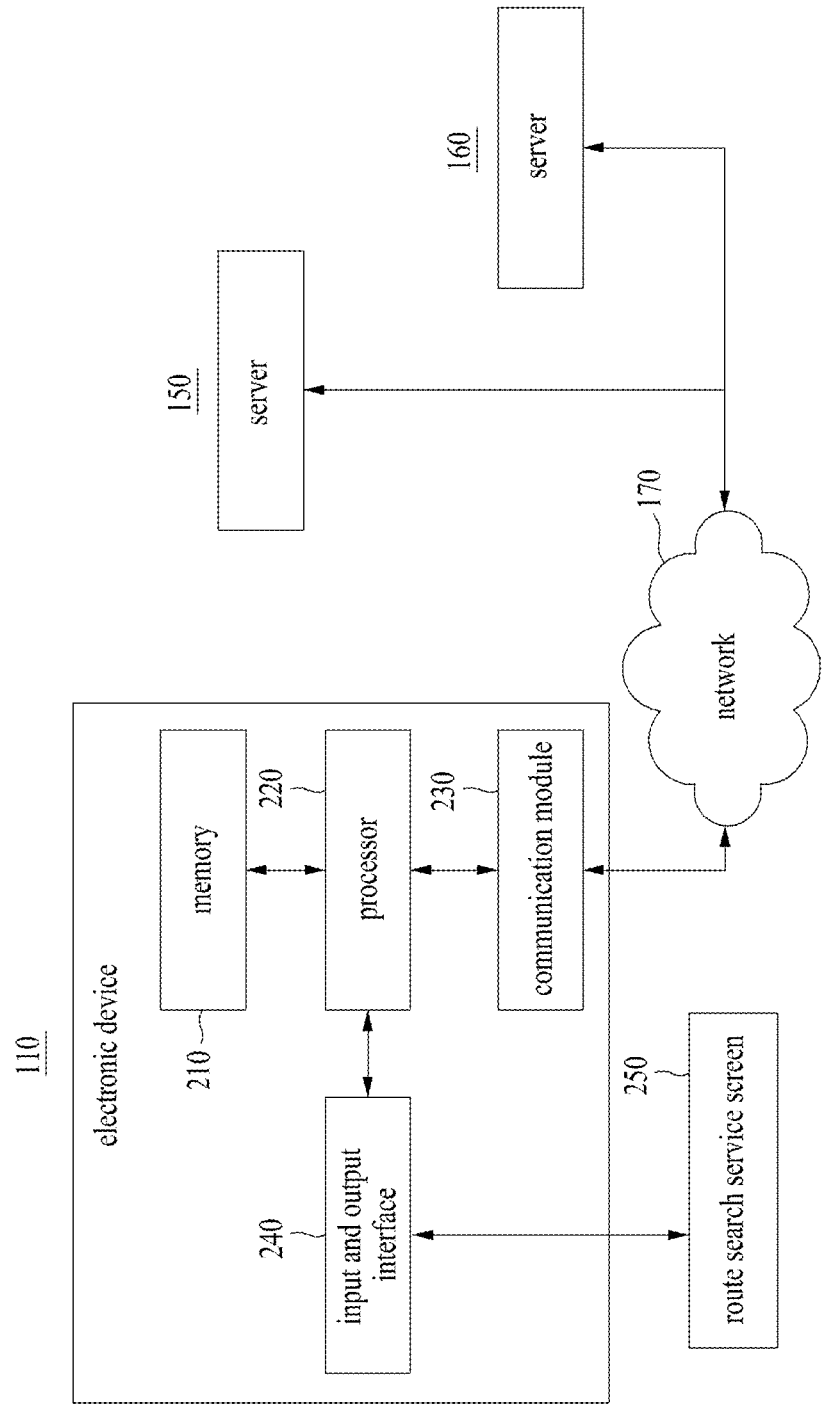
FIG. 2 is a block diagram illustrating a configuration of an electronic device according to an exemplary embodiment of the inventive concept.

FIG. 2 is a block diagram illustrating a configuration of an electronic device according to an exemplary embodiment of the inventive concept. An electronic device 110 may include a memory 210, a processor 220, a communication module 230, and an input and output interface 240. The memory 210 may be a non-transitory computer-readable storage medium and may include permanent mass storage devices such as a random access memory (RAM), a read only memory (ROM), and a disc drive. Also, the memory 210 may store software components, such as an operating system (OS) and at least one program code. These software components may be loaded from a computer-readable storage medium, which is independent of the memory 210, using a drive mechanism. This computer-readable storage medium may include computer-readable storage media such as a floppy disc, a disc, a tape, a digital versatile disc/compact disc-ROM (DVD/CD-ROM) drive, and a memory card. Also, information (e.g., map data, POI data, and the like) necessary for the route search service may be provided to the electronic device 110 through the computer-readable storage medium. In this case, the communication module 230 may be selectively included in the electronic device 110.

In another exemplary embodiment of the inventive concept, the software components may be loaded into the memory 210 through the communication module 230, rather than a computer-readable storage medium. For example, at least one program may be loaded into the memory 210 according to a program installed by files provided by developers through the network 170. Also, information (e.g., map data, POI data, and the like) necessary for the route search service may be received from the servers 150 and 160 through the communication module 230 and may be then stored in the memory 210 or the computer-readable storage medium.

The processor 220 may be configured to process an instruction of a computer program by performing basic arithmetic, logic, and input and output operations. The instruction may be provided to the processor 220 by the memory 210 or the communication module 230. The processor 220 may be configured to execute a program code stored in a storage device such as the memory 210.

The communication module 230 may provide a function for communicating with another device or the servers 150 and 160 through the network 170. For example, a request message generated by the processor 220 according to a control of a user may be transmitted to the servers 150 and 160 through the network 170 according to a control of the communication module 230. In contrast, contents provided from the servers 150 and 160 may be received in the communication module 230 through the network 170 and may then be transmitted to the processor 220 or the memory 210.

The input and output interface 240 may provide a function for connecting with input and output devices which may be further included in the electronic device 110 or may be linked with the electronic device 110. The input devices may include a mouse, a keyboard, a touch panel, a microphone, and the like. The output devices may include a speaker, a display, a touch screen, and the like. For example, a route search service screen 250 configured according to the processing of the processor 220 may be displayed on a display connected through the input and output interface 240.

In other exemplary embodiments of the inventive concept, the electronic device 110 may include more components than that of FIG. 2. However, it is unnecessary to describe or illustrate most conventional components in elaborate detail. For example, the electronic device 110 may further include a display, such as a touch screen, and other components, such as a transceiver and a global positioning system (GPS) module.

Figure 3:
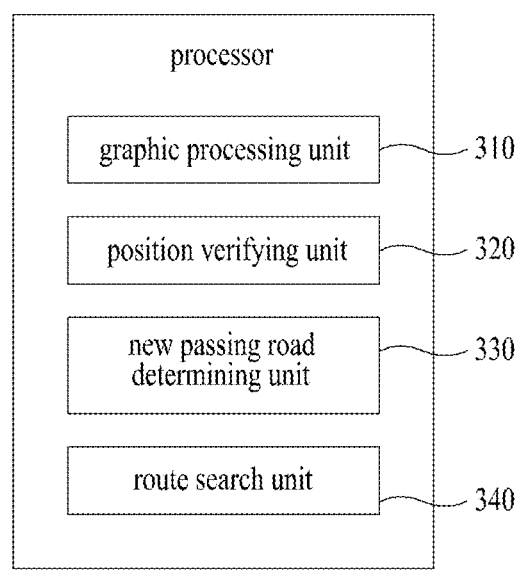
FIG. 3 is a block diagram illustrating a detailed configuration of a processor included in an electronic device according to an exemplary embodiment of the inventive concept.
Figure 4:
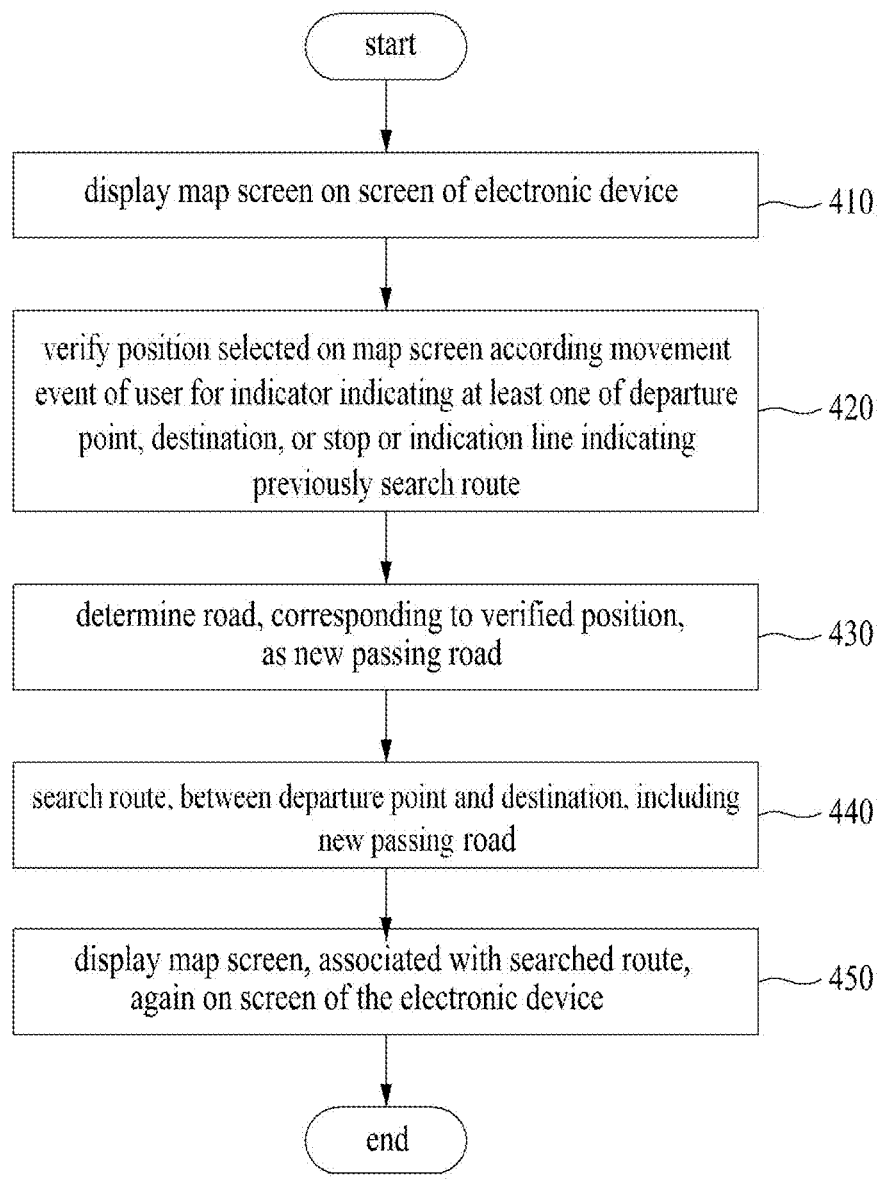
FIG. 4 is a flowchart illustrating an operation of a route search method according to an exemplary embodiment of the inventive concept.

FIG. 3 is a block diagram illustrating a detailed configuration of a processor included in an electronic device according to an exemplary embodiment of the inventive concept. FIG. 4 is a flowchart illustrating an operation of a route search method according to an exemplary embodiment of the inventive concept. A processor 220 included in an electronic device 110 of FIG. 2 may be implemented to include a graphic processing unit 310, a position verifying unit 320, a new passing road determining unit 330, and a route search unit 340. These components may be implemented to execute steps 410 to 450, included in the route search method of FIG. 4, through an operating system (OS) and at least one program code which are stored in a memory 210 of FIG. 2.

In step 410, the graphic processing unit 310 may display a map screen on a screen of the electronic device 110. Since technologies of displaying a map screen on a screen of the electronic device 110 for a map service, a nearby search service, a route search service, and the like in the electronic device 110 such as a smartphone or a navigation device are well known, a detailed description for them will be omitted.

In step 420, the position verifying unit 320 may verify a position selected on the map screen according to a movement event of a user for an indicator indicating at least one of a departure point, a destination, or a stop or an indication line indicating a previously searched route.

For one example, the movement event may be a drag and drop event for an indicator indicating a stop. Specifically, when the electronic device 110 includes a touch screen and when a user of the electronic device 100 touches and drags an indicator on the touch screen and releases the touch of the indicator, the position verifying unit 320 may verify a position (a drop position) where the touch is released. For another example, when the electronic device 110 includes an input means such as a mouse and when the user clicks and moves an indicator displayed on the screen using the mouse and releases the click of the mouse, the position verifying unit 320 may verify a position (a drop position) of the indicator. For another example, the position verifying unit 320 may verify a drop position through a drag and drop event for a specific position of an indication line. For example, when a part (e.g., a finger) of a body of the user is in contact with the touch screen, the processor 220 may determine that the contact of the user is detected on a corresponding point by detecting a contact signal according to the contact of the part of the body and recognizing a X and Y coordinate on the touch screen, in which the contact signal is detected. When the user moves the contacted part of the body in a state where the part of the body keeps in contact with the touch screen, the processor 220 may recognize a change of the position where the contact signal is detected according to the movement of the part of the body. When the contact signal is not detected during a certain time or more, the processor 220 may determine that a point (e.g., an X' and Y' coordinate) on the touch screen, where the contact signal is lastly recognized, is a position, where the contact of the part of the body of the user drops on the touch screen, that is, a drop position.

In step 430, a new passing road determining unit 330 may determine a road corresponding to the verified position as a new passing road. It may not be easy for users to accurately select a specific road on a complex map. Particularly, there is a need for a very complex and delicate task of expanding a map screen including a desired road and selecting the corresponding road in a mobile environment or a touch screen environment. Therefore, in an exemplary embodiment of the inventive concept, a description will be given of an example in which a route search system automatically selects a road corresponding to the verified position. When the user points to an approximate position, the new passing road determining unit 330 may directly select a road corresponding to the pointed-to position.

In this case, the new passing road determining unit 330 may determine the nearest road from the verified position as a new passing road corresponding position. However, it is inefficient to calculate a distance from a corresponding position with respect to all roads. Therefore, the new passing road determining unit 330 may calculate a distance from a corresponding position with respect to only roads displayed on a map screen.

Also, a hierarchical class may be preset to each of all roads. In this case, the new passing road determining unit 330 may determine roads to be displayed according to a map level of the map screen according to this hierarchical class. Therefore, the map screen may display only roads of a class corresponding to a current scale (a map level), rather than displaying all roads of a corresponding region.

In this case, it may be assumed that users do not want to set a road, which is not displayed on a screen in a current map level, to a passing road. The new passing road determining unit 330 may calculate distances between the verified position and roads displayed in a current map level of a map screen and may determine the closest road to the verified position as a new passing road among the displayed roads according to the calculated distances. Therefore, although the user points to only an approximate position, the new passing road determining unit 330 may efficiently determine the closest road to the corresponding position.

In step 440, the route search unit 340 may search for a route, between a departure point and a destination, including the new passing road. When the user moves an indicator indicating a stop in a state where the departure point and the destination are set, the route search unit 340 may search for a route including a new passing road corresponding to a position where the indicator is moved. Also, when the user drags and moves a specific position of an indication line according to a drag and drop event, the route search unit 340 may search a route including a new passing road corresponding to the moved position.

In step 450, the graphic processing unit 310 may display a map screen, associated with the searched route, again on a screen of the electronic device 110. For example, the graphic processing unit 310 may display a map screen, including at least a part of the searched route, on the screen.

Figure 5:
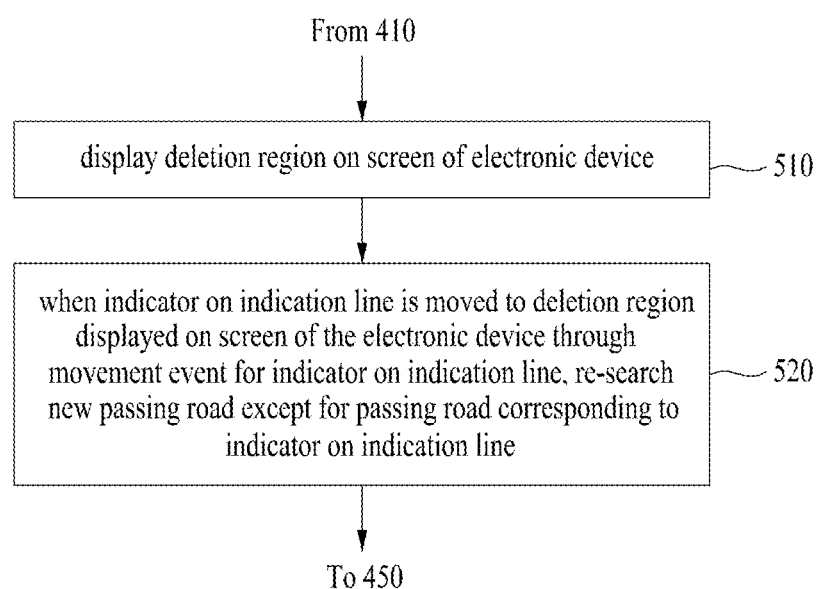
FIG. 5 is a flowchart illustrating a process of deleting a passing road according to an exemplary embodiment of the inventive concept.

FIG. 5 is a flowchart illustrating a process of deleting a passing road according to an exemplary embodiment of the inventive concept. Steps 510 and 520 shown in FIG. 5 may be selectively included in a route search method of FIG. 4 and, for example, may be performed after step 410 of FIG. 4. If necessary, steps 510 and 520 may be performed after a specific event for deleting a passing road is generated.

In step 510, a graphic processing unit 310 of FIG. 3 may display a deletion region on a screen of an electronic device 110 of FIG. 2. This deletion region may be displayed together with displaying a map screen. When a user of the electronic device 110 selects an indicator on an indication line, the deletion region may be activated and displayed on the screen.

In step 520, when the indicator on the indication line is moved to the deletion region displayed on the screen of the electronic device 110 through a movement event for the indicator on the indication line, a route search unit 340 of FIG. 3 may re-search a route except for a passing road corresponding to the indicator on the indication line. For example, the route search unit 340 may detect a deletion action in which the user drags and moves an indicator, corresponding to a new passing road previously included in a route, to the deletion region through a drag and drop event. When detecting this deletion action, the route search unit 340 may re-search a route except for the corresponding new passing road. The graphic processing unit 310 may display the re-searched route again on the screen.

The route search method according to another exemplary embodiment of the inventive concept may further include a step (not shown) of further displaying an indicator display region, where an indicator may be selected, on the screen of the electronic device 110. This step (not shown) may be performed by the graphic processing unit 310. The indicator display region may include at least one of an indicator for indicating a departure point, an indicator indicating a destination, or an indicator indicating a stop. The user may drag an indicator from the indicator display region and may add a departure point, a destination, a stop, and the like on a map screen. For example, a movement event for an indicator may include a movement event for an indicator on an indication line. Also, the movement event for the indicator may include a movement event for an indicator, selected on the indicator display region, on a map screen.

FIGS. 6, 7, 8, and 9 are screens illustrating a process of setting a departure point, a destination, and a stop for a route using a movement event for an indicator according to an exemplary embodiment of the inventive concept.

Figure 6:
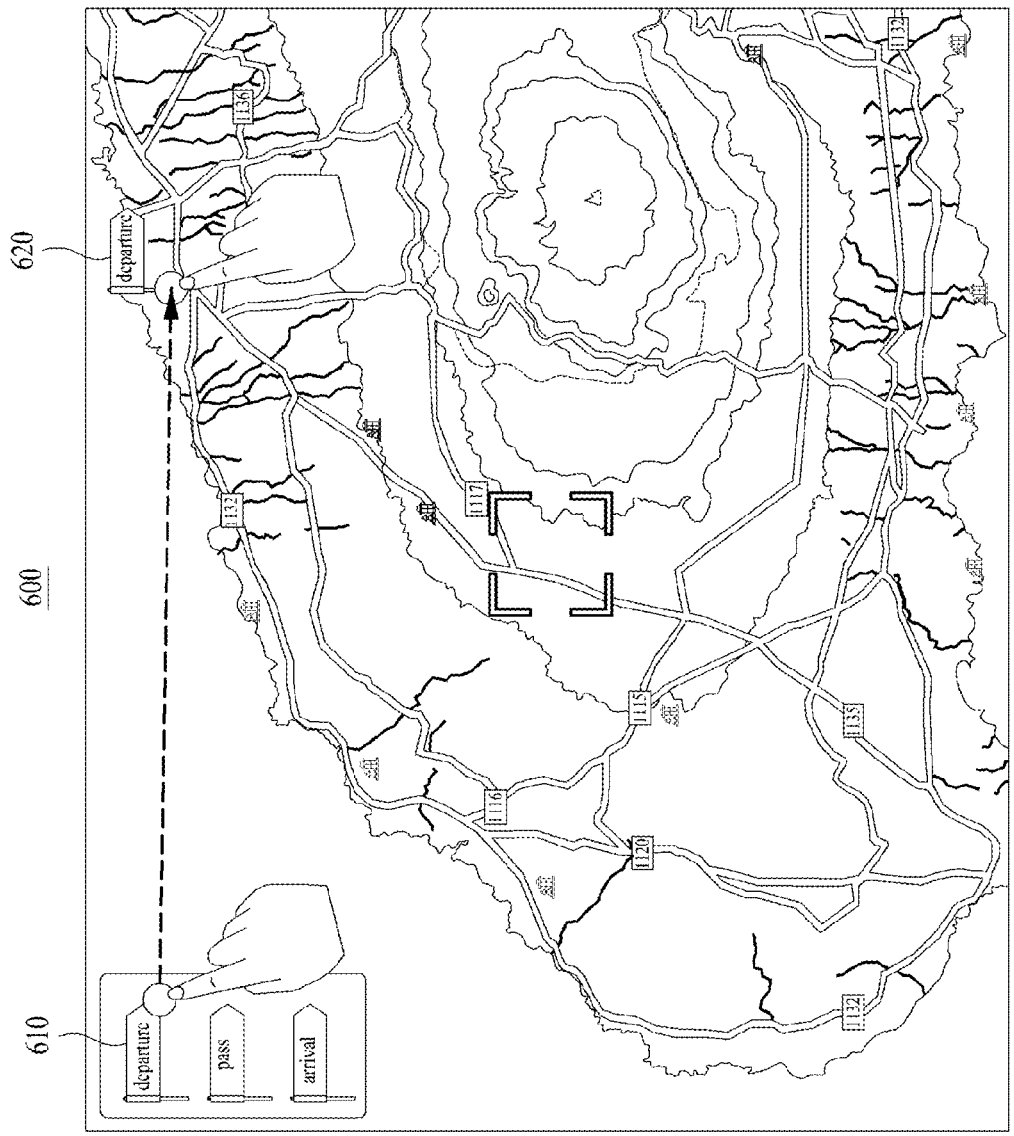
FIGS. 6, 7, 8, and 9 are screens illustrating a process of setting a departure point, a destination, and a stop for a route using a movement event for an indicator according to an exemplary embodiment of the inventive concept.

FIG. 6 illustrates an example in which a user drags and drops an indicator 610 indicating a departure point and selects the departure point on a first screen 600. In this case, as a position where the user drops the indicator 610 is selected as the departure point, a departure point indicator 620 may be displayed on the position of the departure point.

Figure 7:
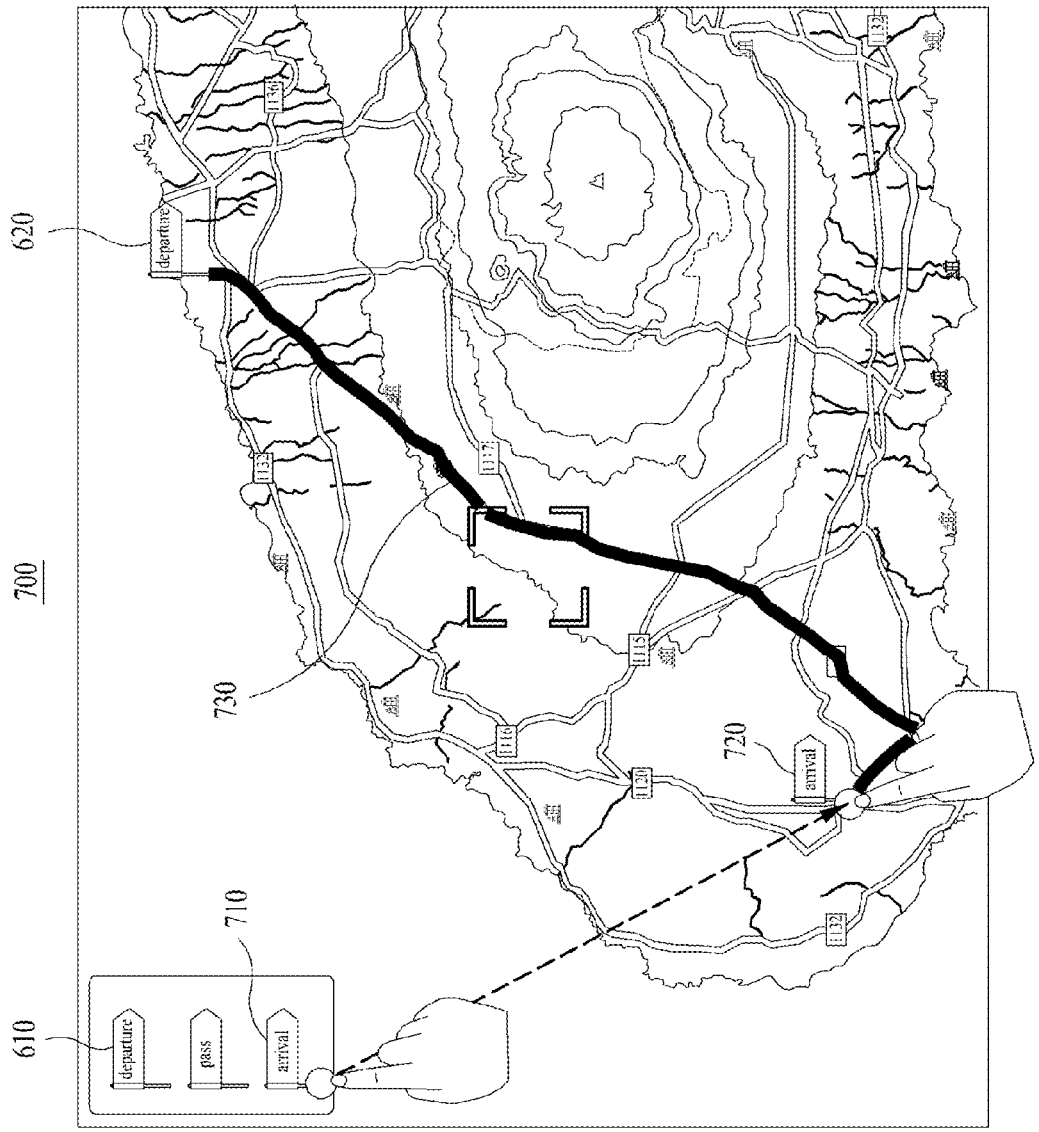

FIG. 7 illustrates an example in which the user drags and drops an indicator 710 indicating a destination and selects the destination on a second screen 700. In this case, as a position where the user drops the indicator 710 is selected as the destination, a destination indicator 720 may be displayed on the position of the destination. Also, FIG. 7 further illustrates an example in which a first route 730 between the departure point and the destination is searched and displayed on the second screen 700 according to the selection of the departure point and the destination.

Figure 8:
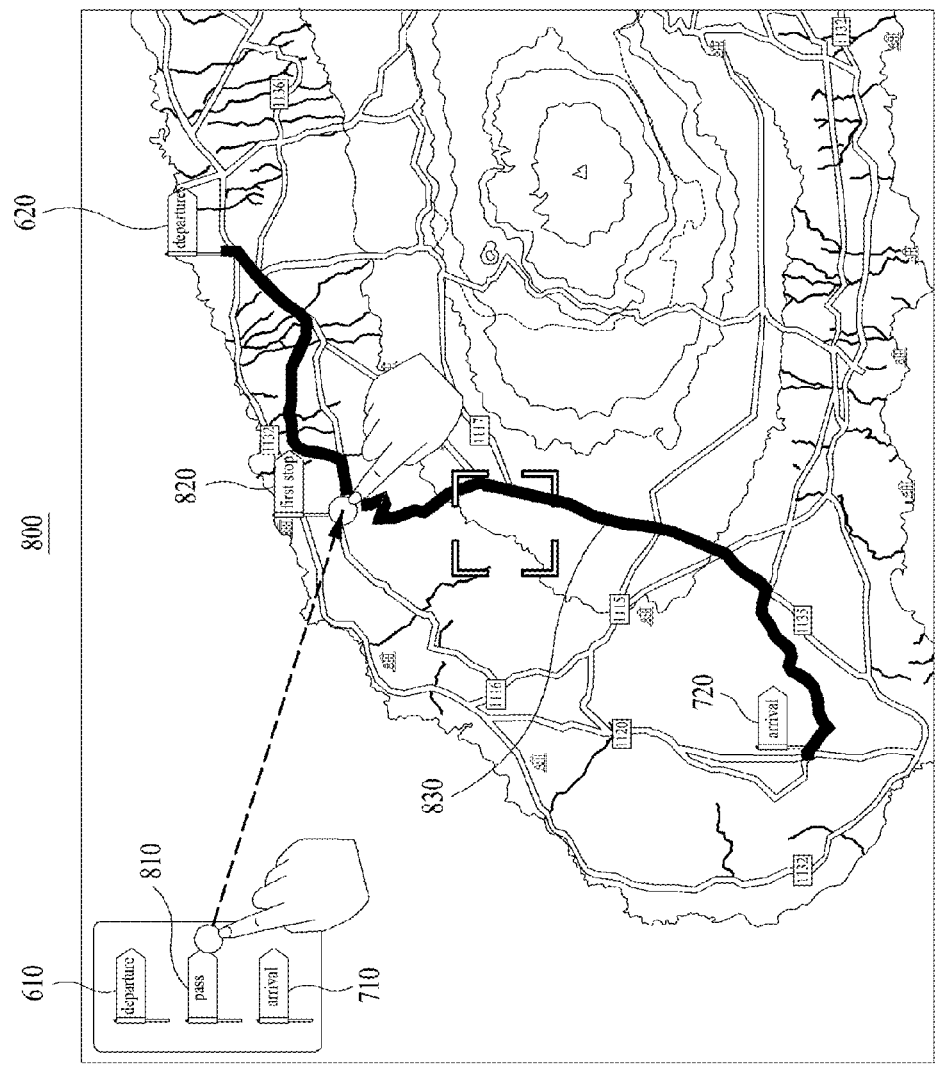

FIG. 8 illustrates an example in which the user drags and drops an indicator 810 indicating a stop and selects a first stop on a third screen 800. In this case, as a position where the user drops the indicator 810 is selected as the first stop, a first stop indicator 820 may be displayed on the position of the first stop. FIG. 8 illustrates an example in which a second route 830 including the first stop between the departure point and the destination is searched and displayed on the third screen 800 according to the selection of the first stop.

Figure 9:
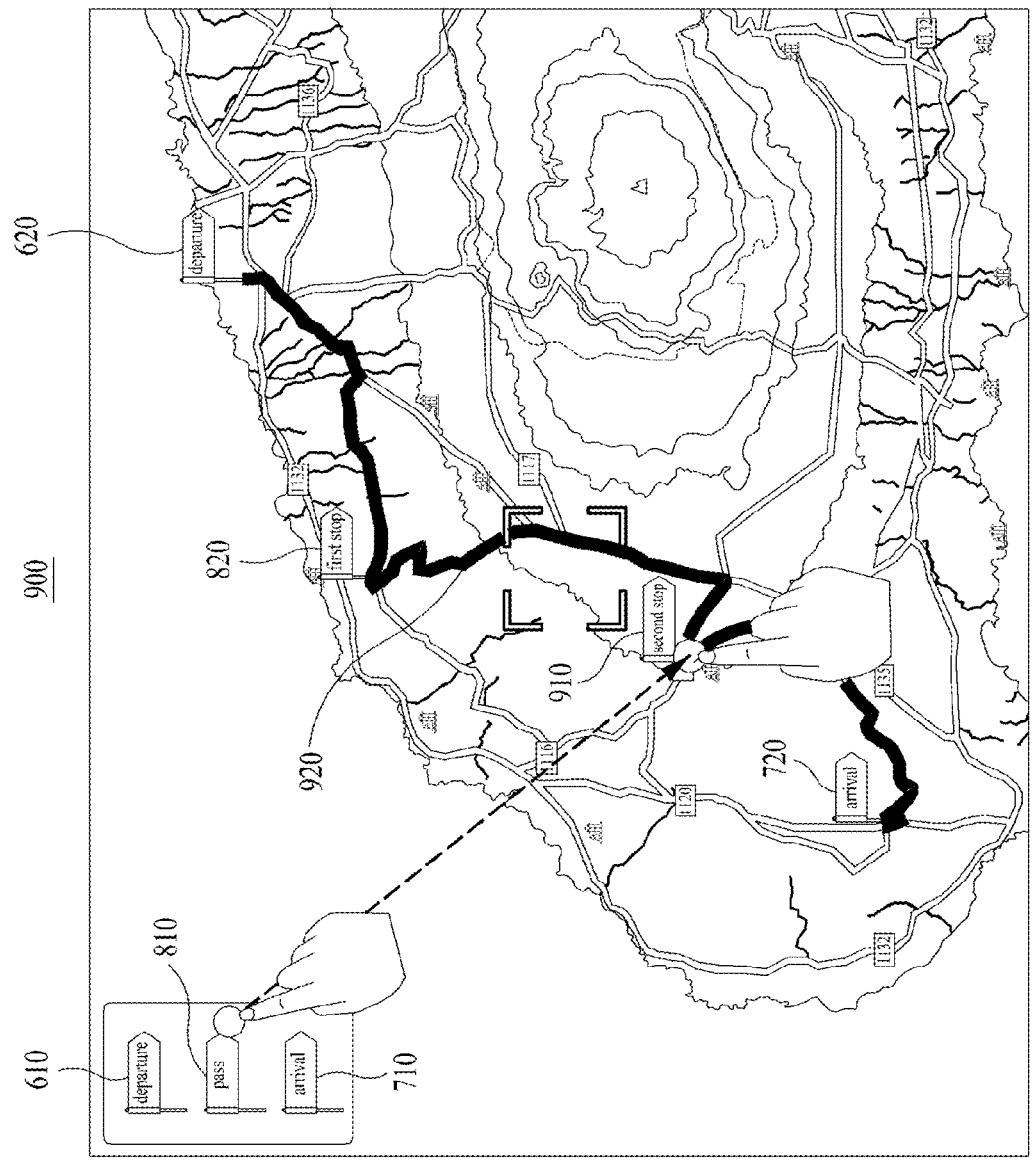

FIG. 9 illustrates an example in which the user drags and drops an indicator 810 indicating a stop and selects a second stop on a $4^{th}$ screen 900. In this case, as a position where the user drops the indicator 810 is selected as the second stop, a second stop indicator 910 may be displayed on the position of the second stop. FIG. 9 illustrates an example in which a third route 920 including the first stop and the second stop between the departure point and the destination is searched and displayed on the $4^{th}$ screen 900 according to the selection of the second stop.

The above-mentioned exemplary embodiments of the inventive concept describe the example of adding two stops. However, the scope and spirit of the inventive concept may not be limited thereto. For example, three or more stops may be added.

Hereinafter, exemplary embodiments of the inventive concept will describe an example of changing the selected departure point, destination, and stop.

Figure 10:
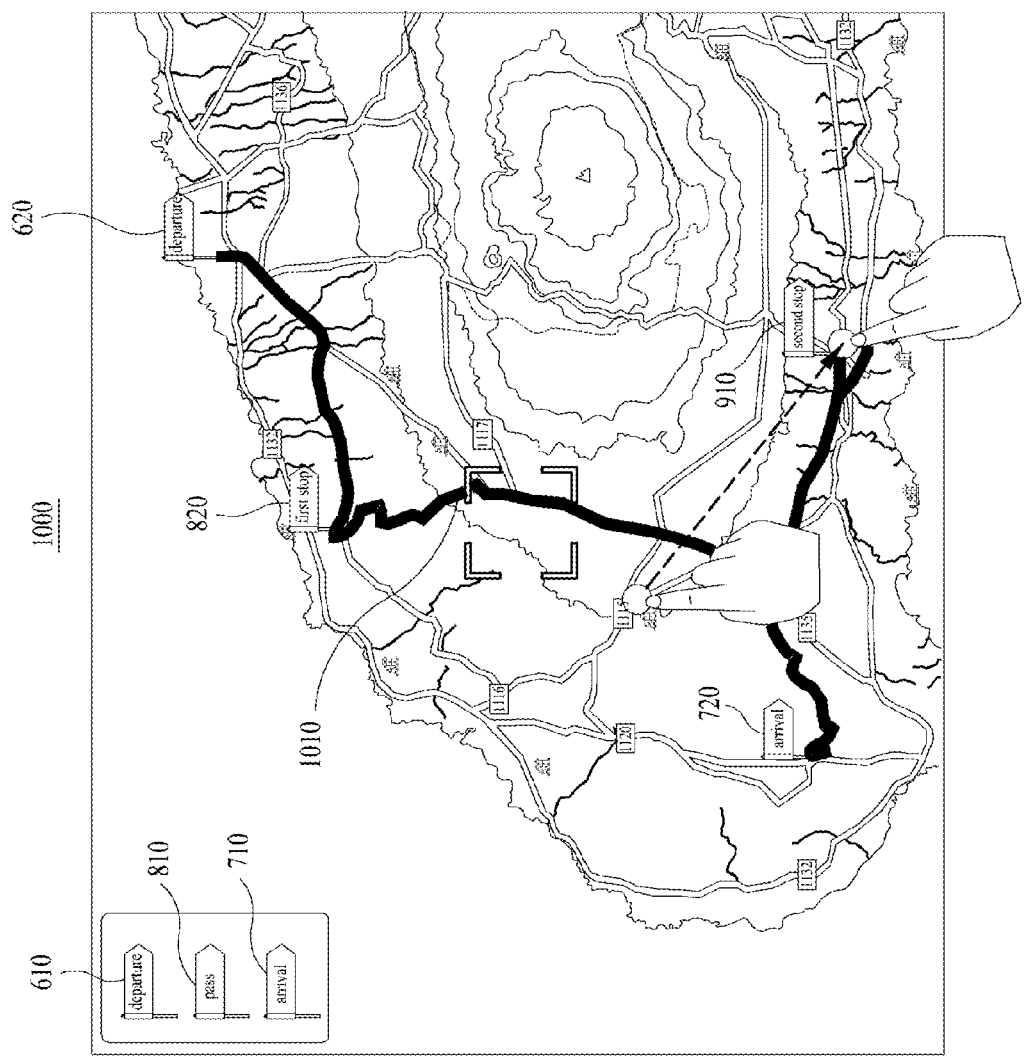
FIGS. 10 and 11 are screens illustrating a process of changing a departure point, a destination, and a stop for a route using a movement event for an indicator according to an exemplary embodiment of the inventive concept.
Figure 11:
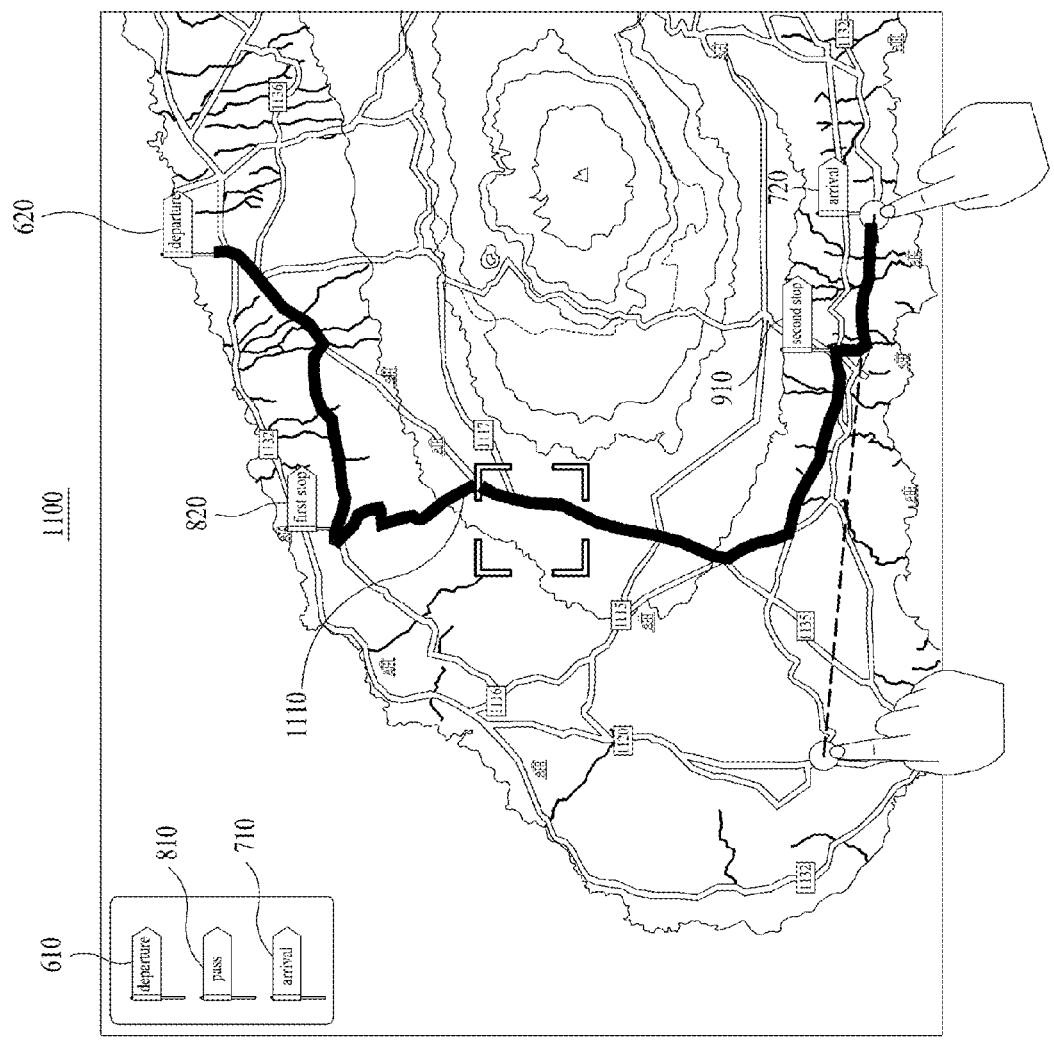

FIGS. 10 and 11 are screens illustrating a process of changing a departure point, a destination, and a stop for a route using a movement event for an indicator according to an exemplary embodiment of the inventive concept.

FIG. 10 illustrates an example in which a user drags and drops a second stop indicator 910 of a $4^{th}$ screen 900 of FIG. 9 and changes a second stop on a $5^{th}$ screen 1000. In this case, as a position where the user drops the second stop indicator 910 is changed to the second stop, the second stop indicator 910 may be displayed on the changed position. FIG. 10 illustrates an example in which a $4^{th}$ route 1010 including a first stop and the changed second stop between a departure point and a destination is searched and displayed on the $5^{th}$ screen 1000 according to the change of the second stop.

FIG. 11 illustrates an example in which the user drags and drops a destination indicator 720 of a $5^{th}$ screen 1000 of FIG. 10 and changes a destination on a $6^{th}$ screen 1100. In this case, as a position where the user drops the destination indicator 720 is changed to the destination, the destination indicator 720 may be displayed on the changed position. FIG. 11 illustrates an example in which a $5^{th}$ route 1110 including the first stop and the second stop between the departure point and the changed destination is searched and displayed on the $6^{th}$ screen 1100 according to the change of the destination.

Figure 12:
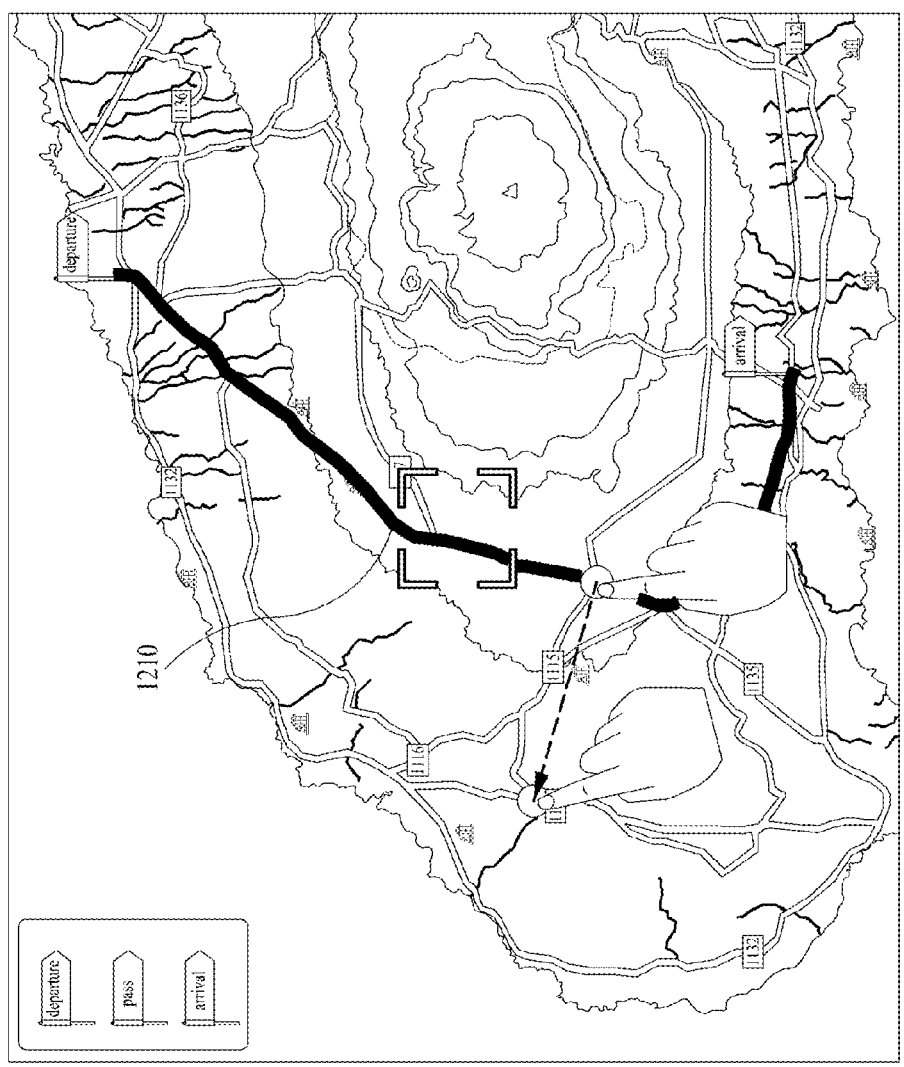
FIGS. 12 and 13 are screens illustrating a process of re-searching a route using a movement event for an indication line according to an exemplary embodiment of the inventive concept.
Figure 13:
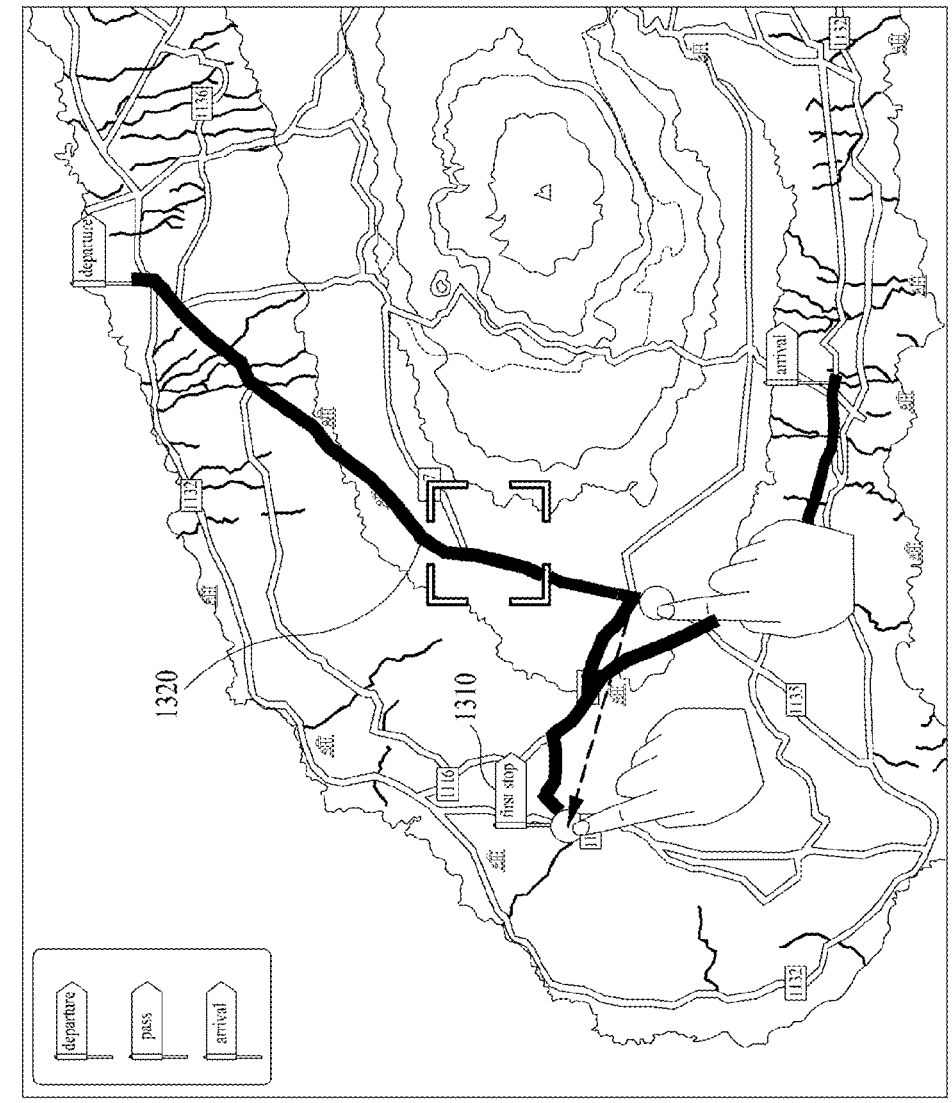

FIGS. 12 and 13 are screens illustrating a process of re-searching a route using a movement event for an indication line according to an exemplary embodiment of the inventive concept.

FIG. 12 illustrates an example in which a user generates a drag and drop event on a $7^{th}$ screen 1200 for a route indication line 1210 indicating a route between a selected departure point and a selected destination. In this case, a drop position may be set to a stop.

FIG. 13 illustrates an example in which a stop is set on a position where a drop occurs on the $7^{th}$ screen 1200 and a stop indicator 1310 is displayed on an $8^{th}$ screen 1300. FIG. 13 illustrates an example in which a new route 1310 including a route between a departure point and a destination is searched and displayed on the $8^{th}$ screen 1300.

As such, although the user does not select a separate indicator, he or she may select a stop in an intuitive method such as a drag and drop event for an indication line.

Figure 14:
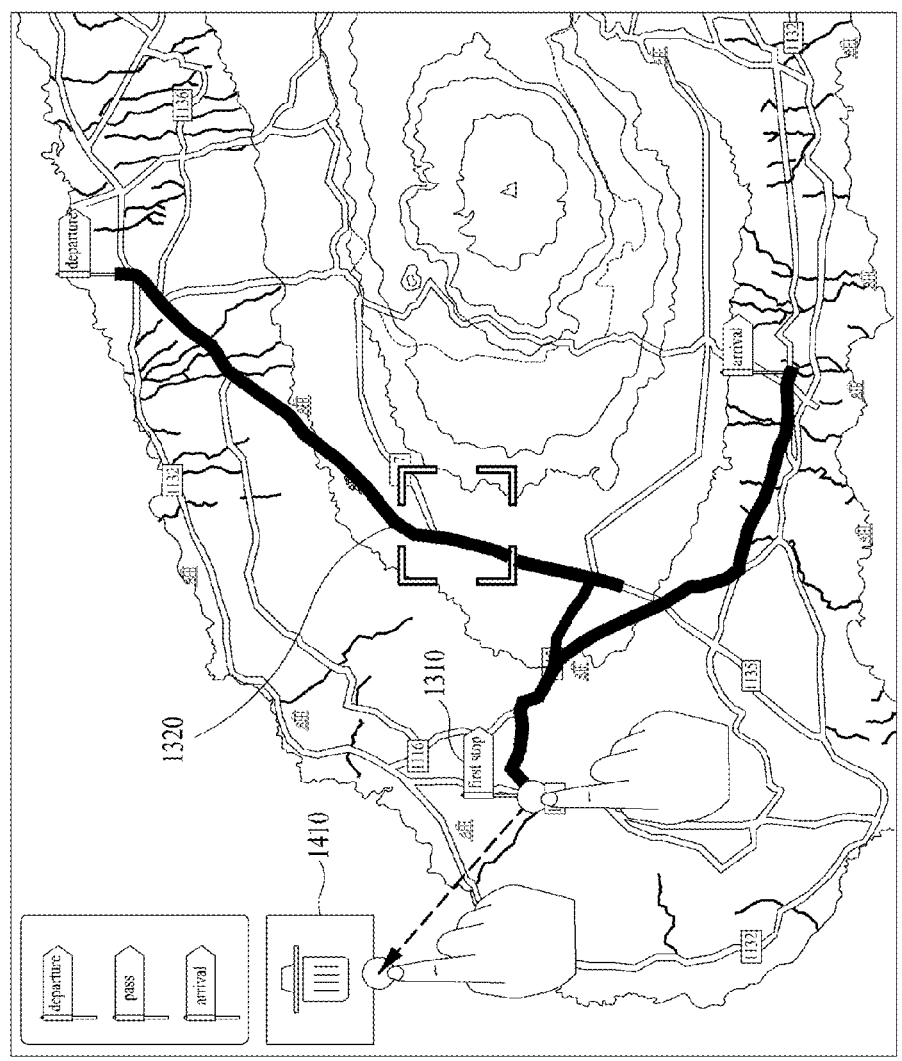
FIG. 14 is a screen illustrating a process of deleting a stop according to an exemplary embodiment of the inventive concept.

FIG. 14 is a screen illustrating a process of deleting a stop according to an exemplary embodiment of the inventive concept. As described above, a graphic processing unit 310 of FIG. 3 may display a deletion region on a screen of an electronic device 110 of FIG. 2.

A $9^{th}$ screen 1400 may display a deletion user interface 1410 corresponding to a deletion region. FIG. 14 illustrates an example in which a user drags and drops a stop indicator 1310 on the deletion user interface 1410. In this case, a stop may be deleted. Alternatively, the stop on the $9^{th}$ screen 1400 of FIG. 14 may be changed again to a route between a selected departure point and a selected destination on a $7^{th}$ screen 1200 of FIG. 12.

Deletion may be performed for an indication line indicating a departure point, a destination, or a route as well as a stop. When the user drags and drops an indication line, indicating a route, on the deletion user interface 1410, a service may be provided to delete a departure point and a destination together with a stop at once.

In another exemplary embodiment of the inventive concept, when an indication line is deleted, only a route of a section where a touch (or a click) first occurs may be deleted. For example, when the user touches (or clicks) and deletes an indication line of a route between a destination and a stop, as the stop is changed to the destination, the route may be changed (re-searched) such that only a route between the departure point and the new destination is preset.

Also, the deletion user interface 1410 may be displayed on other screens other than the $9^{th}$ screen 1400 of FIG. 14. In another exemplary embodiment of the inventive concept, when indicators for a departure point, a destination, and a stop which are set in advance or an indication line for a route are selected (touched or clicked), the deletion user interface 1410 may be dynamically activated. In other words, the deletion user interface 1410 may be usually hidden and may be activated and displayed at the time that deletion is requested.

As described above, for convenience of description, the exemplary embodiments of the inventive concept in which a route is set relative to a position (a drop position) selected by the user are described. Hereinafter, a description will be given of exemplary embodiments of the inventive concept, which specify a passing road through a position selected by the user.

Figure 15:
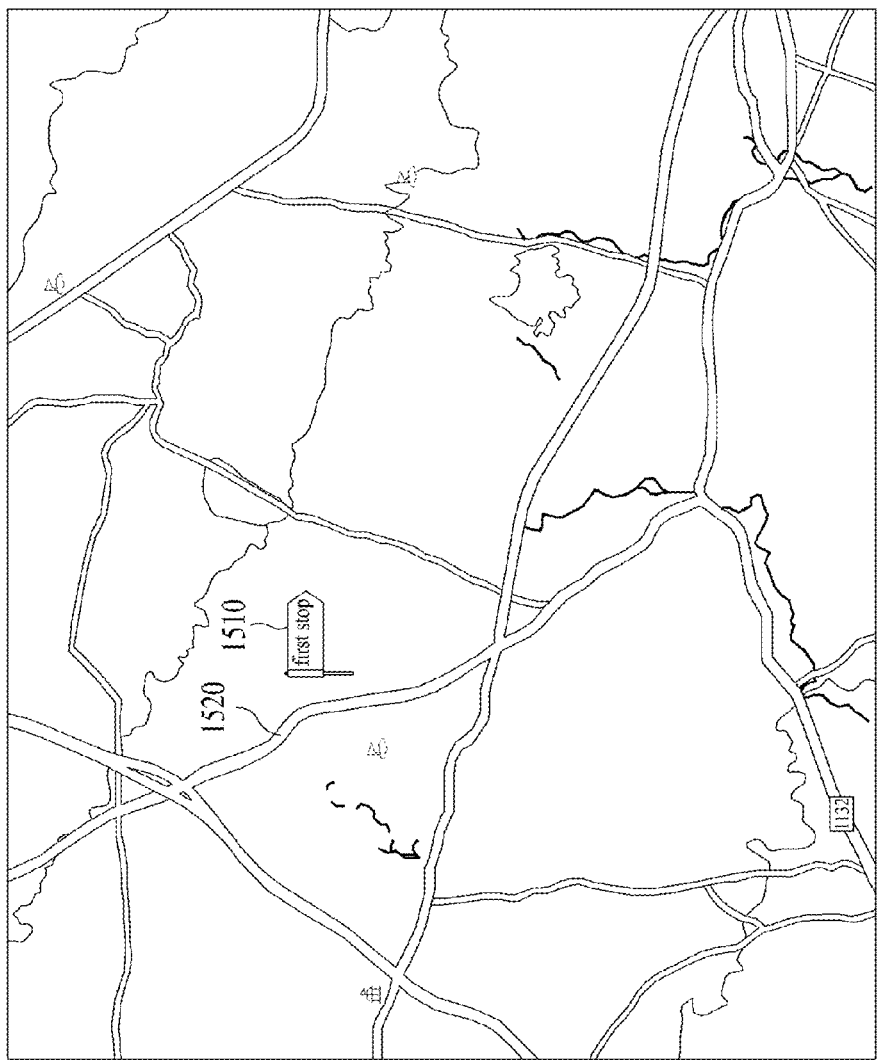
FIGS. 15 and 16 are screens illustrating a process of selecting a selection position of a user as a passing road according to an exemplary embodiment of the inventive concept.
Figure 16:
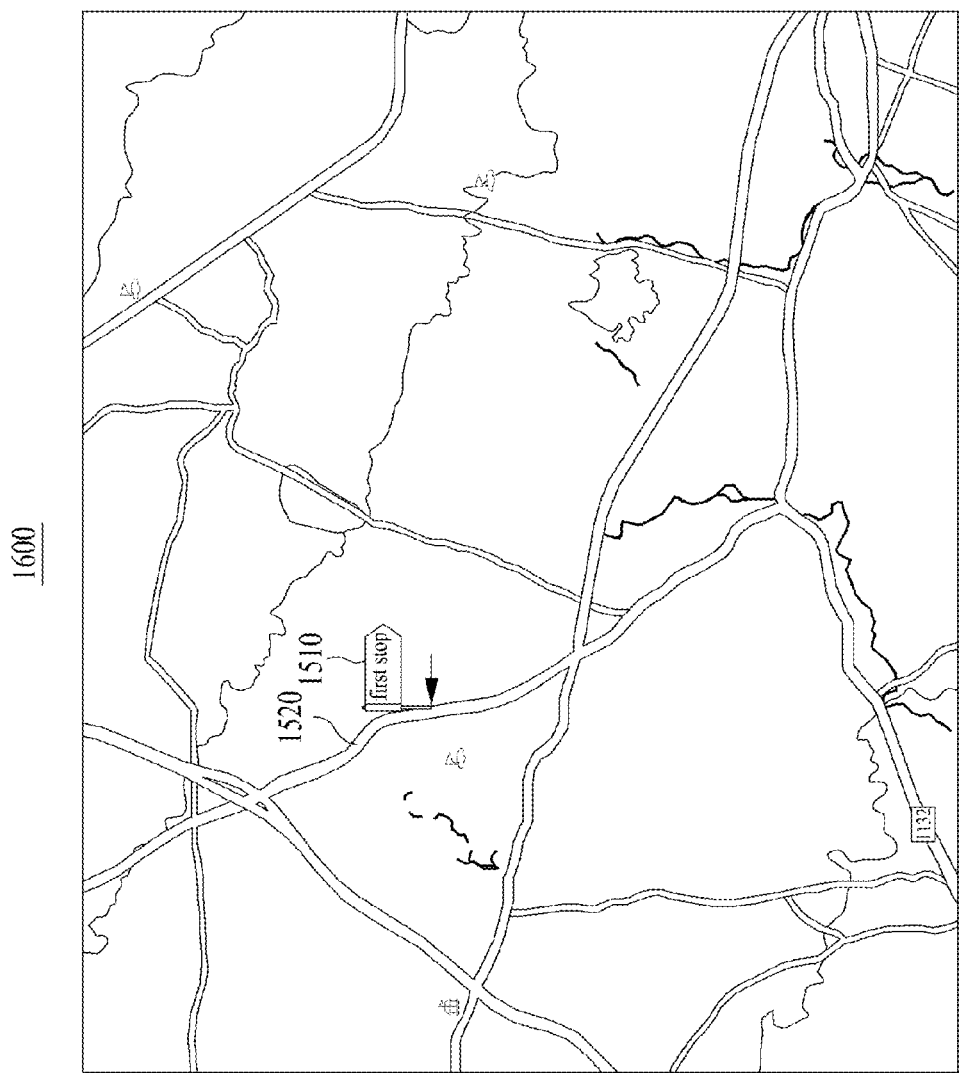

FIGS. 15 and 16 are screens illustrating a process of selecting a selection position of a user as a passing road according to an exemplary embodiment of the inventive concept. It may not be easy to accurately select a position on a desired passing road in a mobile terminal or a terminal using a touch screen. FIG. 15 illustrates an example in which a position where the user drops a stop indicator 1510 is not a road on a $10^{th}$ screen 1500.

In this case, a new passing road determining unit 330 of FIG. 3 may calculate distances between roads displayed in a current map level of a map screen and a selection position of the user and may determine the closest road 1520, to the selection position of the user among the displayed roads, as a new passing road according to the calculated distances.

FIG. 16 illustrates an example in which the stop indicator 1510 is moved to the closest road 1520 which is the new passing road on an $11^{th}$ screen 1600. In this case, a route may be re-searched to include the new passing road.

Actually, there are more roads than roads displayed on the $10^{th}$ screen 1500 and the $11^{th}$ screen 1600. However, as described above, the new passing road determining unit 330 may determine roads to be displayed according to a map level of a map screen according to a hierarchical class preset to each of all roads. However, the new passing road determining unit 330 may find the closest road to a selection position of the user by measuring distances from the selection position of the user only with respect to roads currently displayed on a map screen rather than all identifiable roads.

This is because the user wants to select roads displayed on a screen of an electronic device. Also, this is because it is unnecessary to calculate distances of roads outside the screen of an electronic device or distances of roads that are not displayed on the screen because of having a low class.

Figure 17:
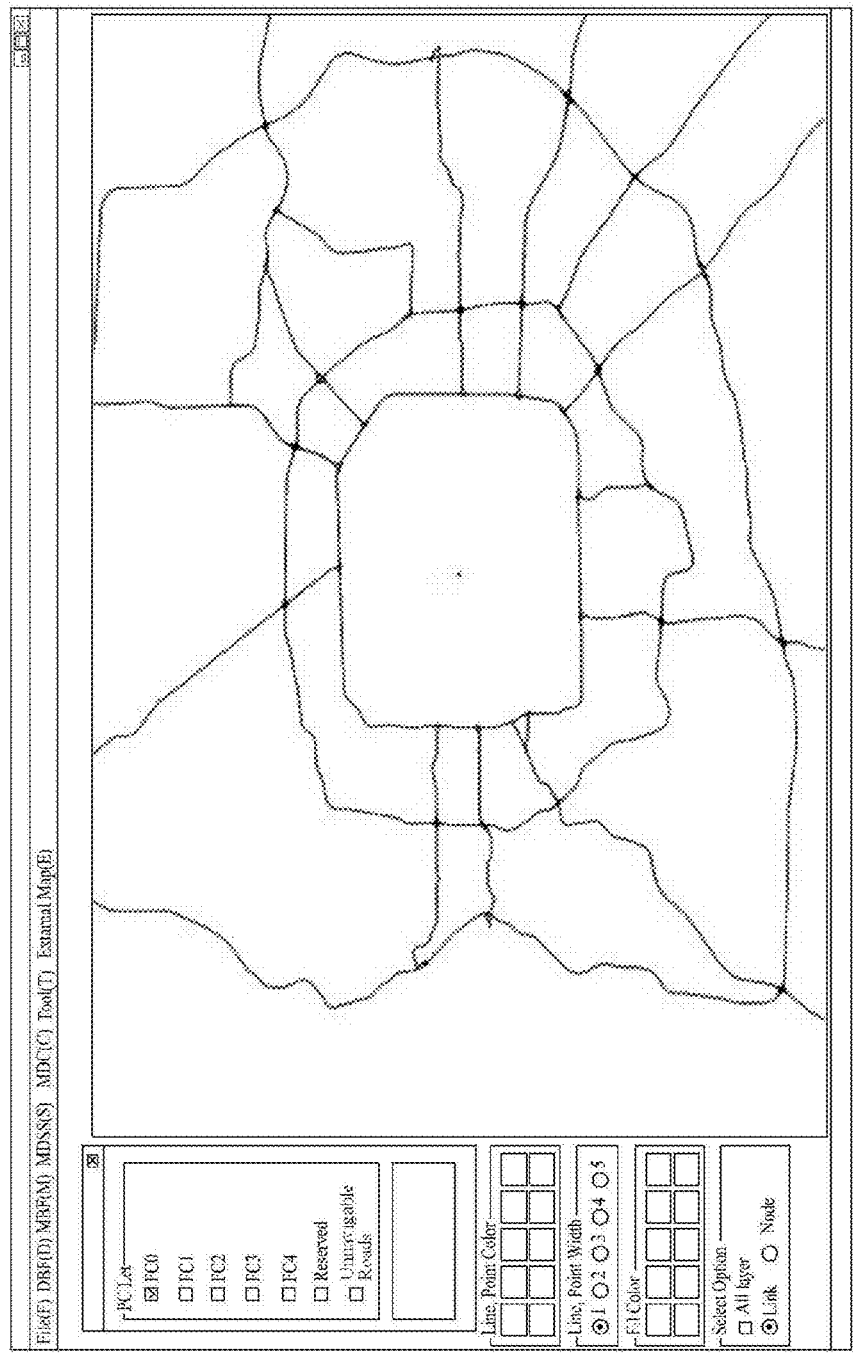
FIGS. 17, 18, 19, 20, and 21 are screens illustrating a road network for each functional road class (FC) level according to an exemplary embodiment of the inventive concept.

FIGS. 17, 18, 19, 20, and 21 are screens illustrating a road network for each functional road class (FC) level according to an exemplary embodiment of the inventive concept. According to a geographic data file (GDF) standard, a road network may be classified as an FC level 0 indicating a main road, an FC level 1 indicating a first class road, an FC level 2 indicating a second class road, an FC level 3 indicating a third class road, or an FC level 4 indicating a $4^{th}$ class road, FIG. 17 illustrates an example in which a screen 1700 displays a road network of the main road classified as the FC level 0.

Figure 18:
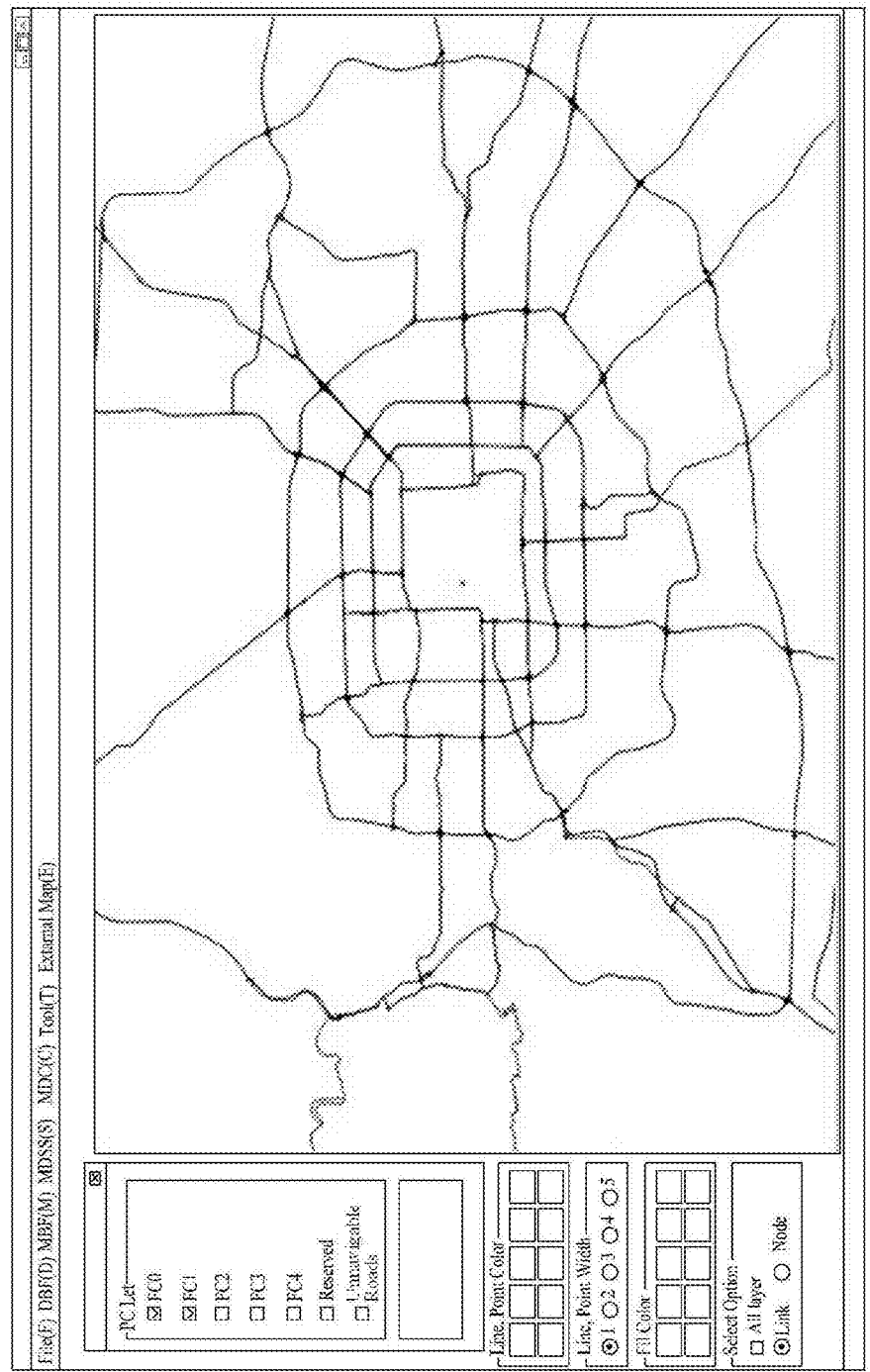

FIG. 18 illustrates an example in which a screen 1800 displays a road network of the main road classified as the FC level 0 and a road network of the first class road classified as the FC level 1.

Figure 19:
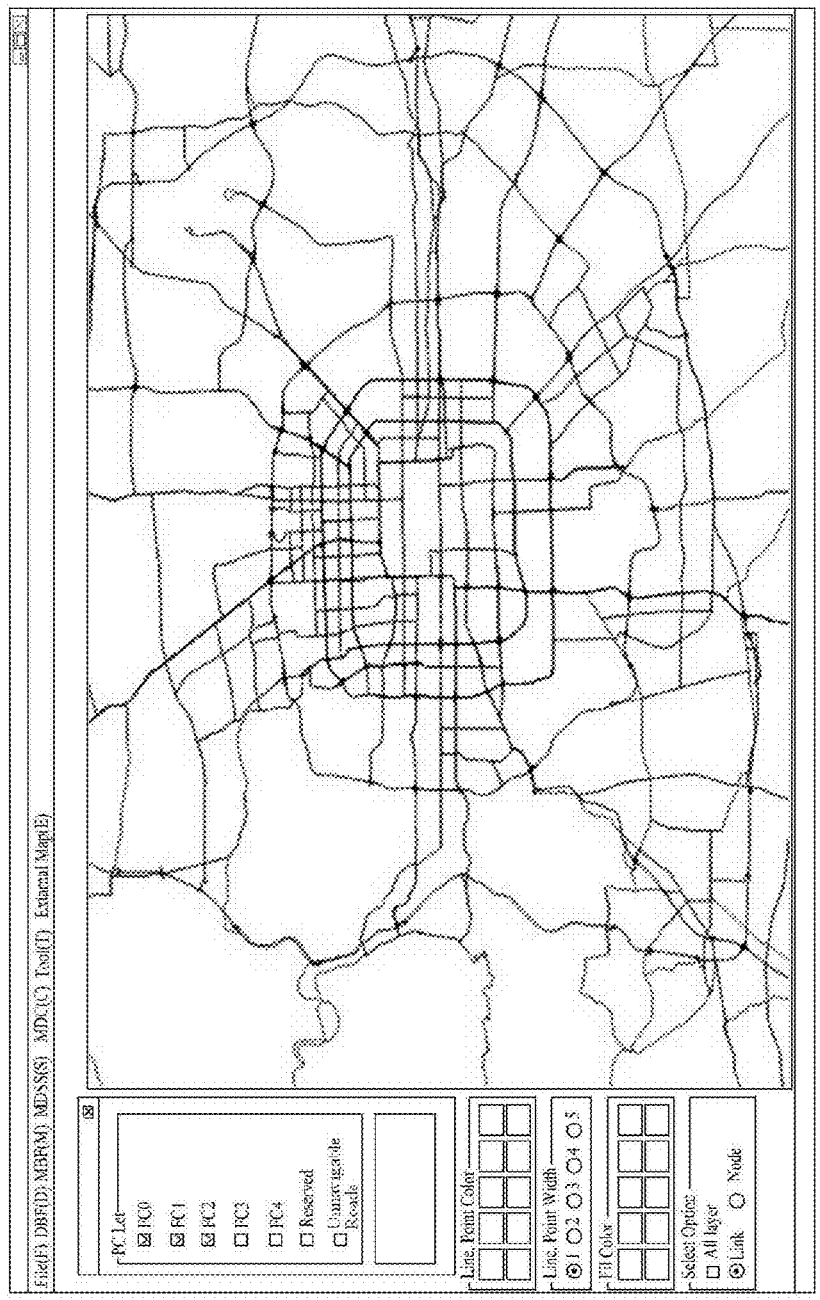

FIG. 19 illustrates an example in which a screen 1900 displays a road network of the main road classified as the FC level 0, a road network of the first class road classified as the FC level 1, and a road network of the second class road classified as the FC level 2.

Figure 20:
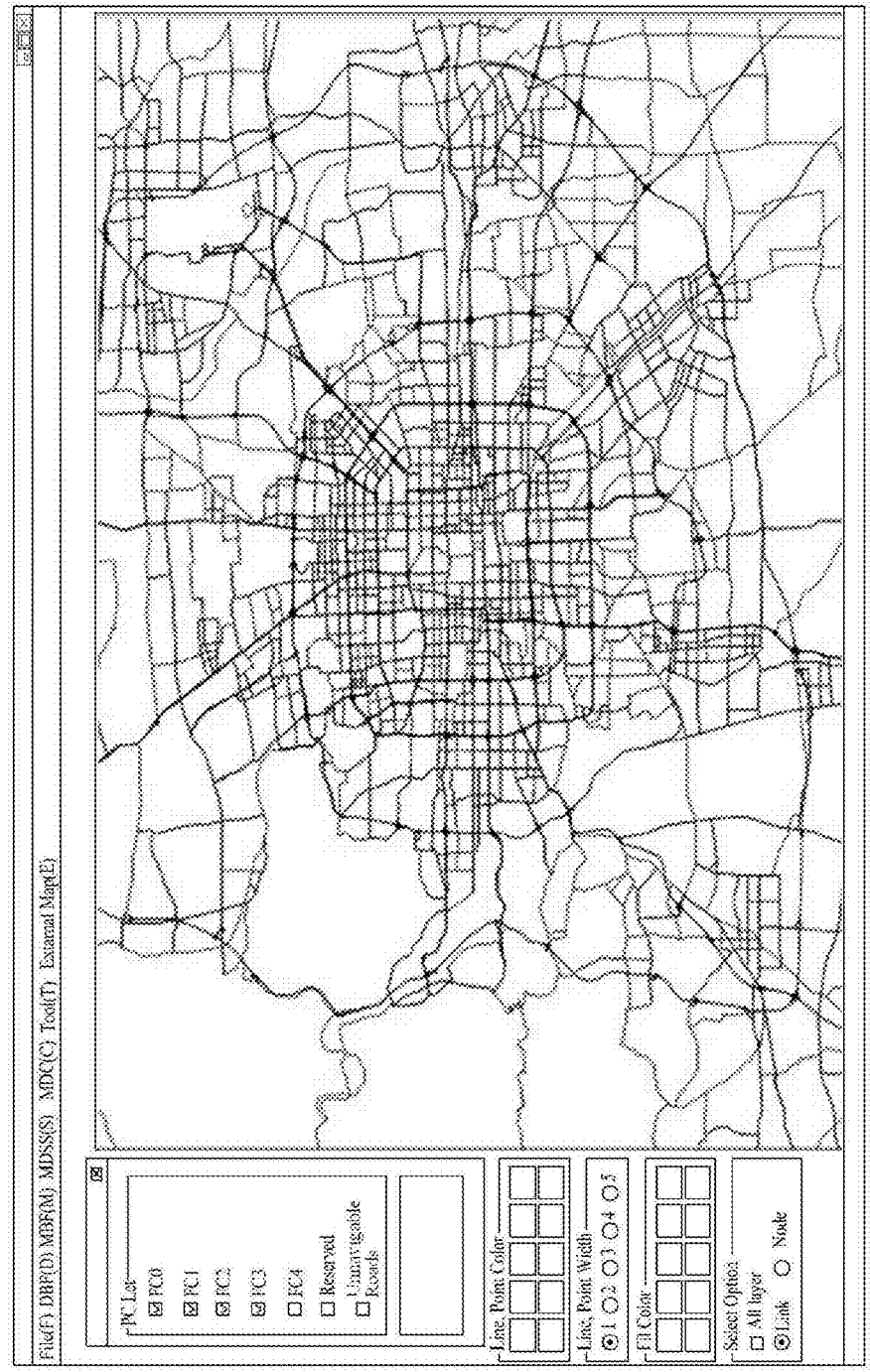

FIG. 20 illustrates an example in which a screen 2000 displays a road network of the main road classified as the FC level 0, a road network of the first class road classified as the FC level 1, a road network of the second class road classified as the FC level 2 and a road network of the third class road classified as the FC level 3.

Figure 21:
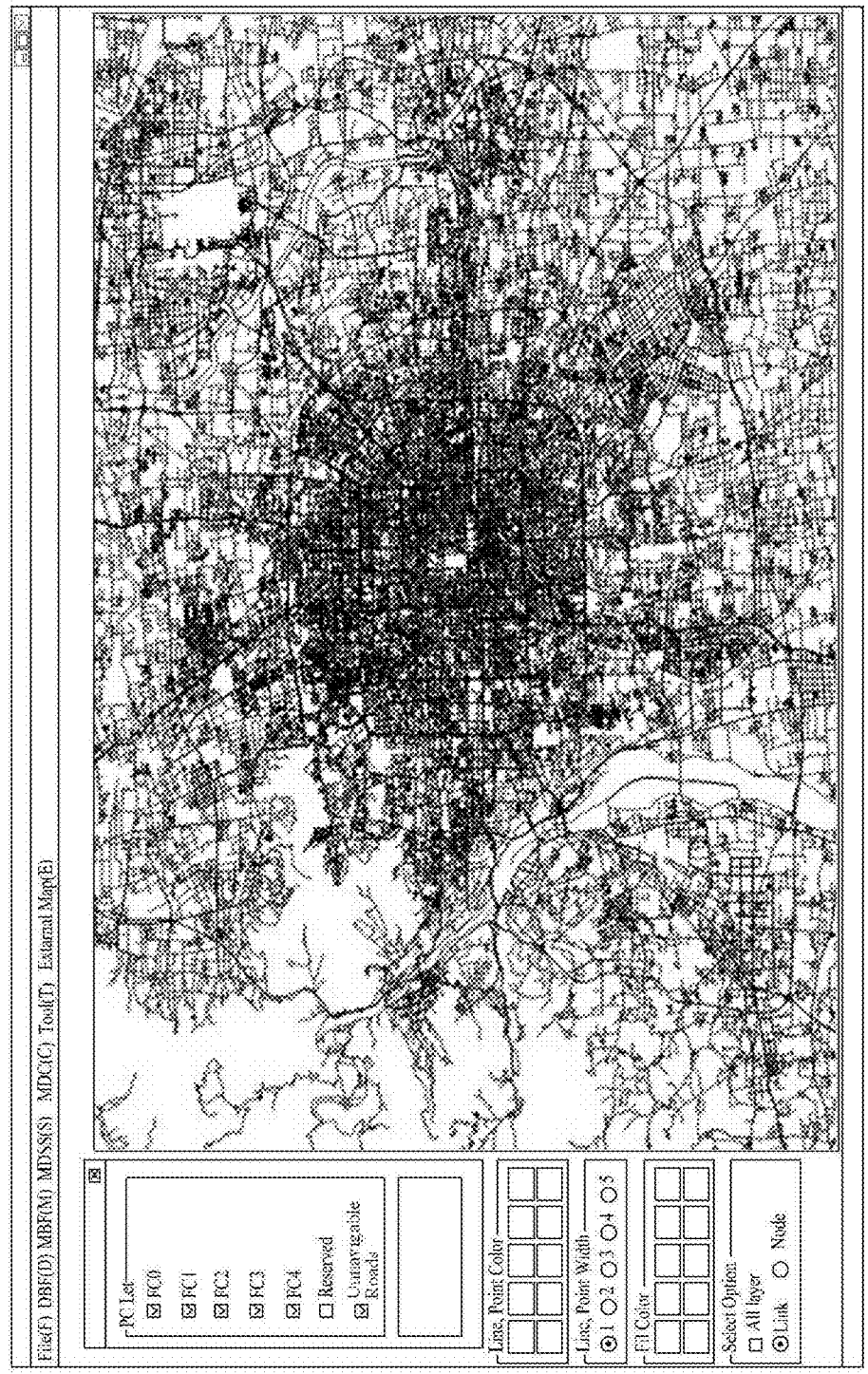

FIG. 21 illustrates an example in which a screen 2100 displays all road networks of all levels.

As such, a road displayed on a map screen may be changed according to a hierarchical class of a road network. A new passing road determining unit 330 of FIG. 3 may match a new passing road to a position on the closest road to a selection position of a user among roads displayed in a map level of the corresponding map screen. For example, when only a main road classified as the FC level 0 is displayed in a specific map level, the new passing road determining unit 330 may calculate a distance from a selection position of the user only with respect to the main road displayed on the map screen.

The above-described GDF standard may be an example. A class of each road in a road network may be set to be different from the GDF standard.

As such, according to exemplary embodiments of the inventive concept, the electronic device may provide a route search service which may perform an editing function of easily and conveniently adding and/or deleting a destination and/or a road users want to intentionally pass or avoid on a route and conveniently moving the added destination or road.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A route search method implemented with a computer, comprising:
    displaying a map screen on a screen of an electronic device;
    verifying a position selected on the map screen according to a movement event of a user for a user interface region for adding at least one of a departure point, a destination, or a stop or an indication line indicating a previously searched route;
    determining a road, corresponding to the verified position, as a new passing road;
    searching a route, between the departure point and the destination, including the new passing road; and
    displaying a map screen, associated with the searched route, again on the screen of the electronic device,
    wherein, on the screen of the electronic device, a user interface in the user interface region for adding, when the user interface is dragged and dropped into a position on the map screen by the movement event, the stop on the dropped position on the map screen is displayed independently of the displayed map screen and the searched route,
    wherein the displayed searched route includes the stop added on the dropped position, and
    wherein the method further comprises:
    displaying a deletion user interface on the screen of the electronic device independently of the displayed map screen and the searched route; and
    when the added stop on the searched route is dragged and dropped into the deletion user interface by a movement event of the user, removing the added stop on the searched route, and re-searching a route between the departure point and the destination in which the added stop is not included.

2. The route search method of claim 1, further comprising:
    determining roads to be displayed according to a map level of the map screen according to a hierarchical class which is preset to each of all roads,
    wherein the determining of the road corresponding to the verified position as the new passing road comprises:
    calculating distances between the verified position and roads displayed in a current map level of the map screen; and
    determining the closest road to the verified position as the new passing road among the displayed roads according to the calculated distances.

3. A non-transitory computer-readable storage medium storing a program when executed by at least one processor cause the processor to perform steps comprising:
    displaying a map screen on a screen of an electronic device;
    verifying a position selected on the map screen according to a movement event of a user for a user interface region for adding at least one of a departure point, a destination, or a stop or an indication line indicating a previously searched route;
    determining a road, corresponding to the verified position, as a new passing road;
    searching a route, between the departure point and the destination, including the new passing road; and
    displaying a map screen, associated with the searched route, again on the screen of the electronic device,
    wherein, on the screen of the electronic device, a user interface in the user interface region for adding, when the user interface is dragged and dropped into a position on the map screen by the movement event, the stop on the dropped position on the map screen is displayed independently of the displayed map screen and the searched route,
    wherein the displayed searched route includes the stop added on the dropped position, and
    wherein the steps further comprise:
    displaying a deletion user interface on the screen of the electronic device independently of the displayed map screen and the searched route; and
    when the added stop on the searched route is dragged and dropped into the deletion user interface by a movement event of the user, removing the added stop on the searched route, and re-searching a route between the departure point and the destination in which the added stop is not included.

4. A route search system, comprising:
    one or more processors,
    wherein each of the one or more processors comprises:
    a graphic processing unit configured to display a map screen on a screen;
    a position verifying unit configured to verify a position selected on the map screen according to a movement event of a user for a user interface region for adding at least one of a departure point, a destination, or a stop or an indication line indicating a previously searched route;
    a new passing road determining unit configured to determine a road, corresponding to the verified position, as a new passing road; and
    a route search unit configured to search a route, between the departure point and the destination, including the new passing road, wherein the graphic processing unit displays the map screen, associated with the searched route, again on the screen, wherein, on the screen, a user interface in the user interface region for adding, when the user interface is dragged and dropped into a position on the map screen by the movement event, the stop on the dropped position on the map screen is displayed independently of the displayed map screen and the searched route, and wherein the displayed searched route includes the stop added on the dropped position, and wherein the graphic processing unit displays a deletion user interface on the screen independently of the displayed map screen and the searched route, and wherein when the added stop on the searched route is dragged and dropped into the deletion user interface by a movement event of the user, the graphic processing unit removes the added stop on the searched route, and the route search unit re-searches a route between the departure point and the destination in which the stop is not included.

5. The route search system of claim 4, wherein the new passing road determining unit determines roads to be displayed according to a map level of the map screen according to a hierarchical class which is preset to each of all roads, wherein the new passing road determining unit calculates distances between the verified position and roads displayed in a current map level of the map screen and determines the closest road to the verified position as the new passing road among the displayed roads according to the calculated distances.

* * * * *